No. 876,470.
M. F. MAUS.
MEANS FOR PROPELLING VESSELS.
APPLICATION FILED MAR. 24, 1906.
PATENTED JAN. 14, 1908.
5 SHEETS—SHEET 3.
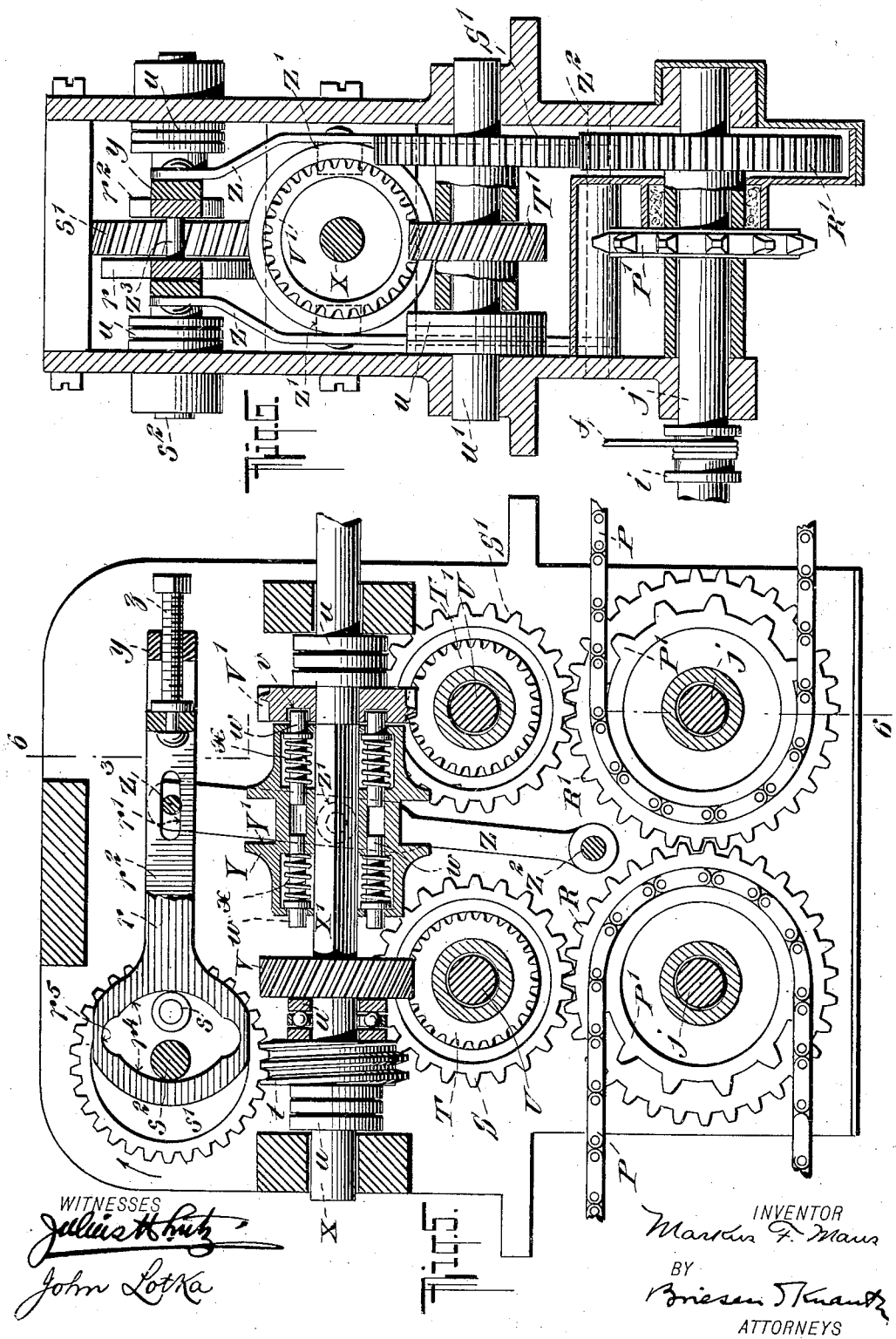
WITNESSES
INVENTOR
Markus F. Maus
BY
ATTORNEYS

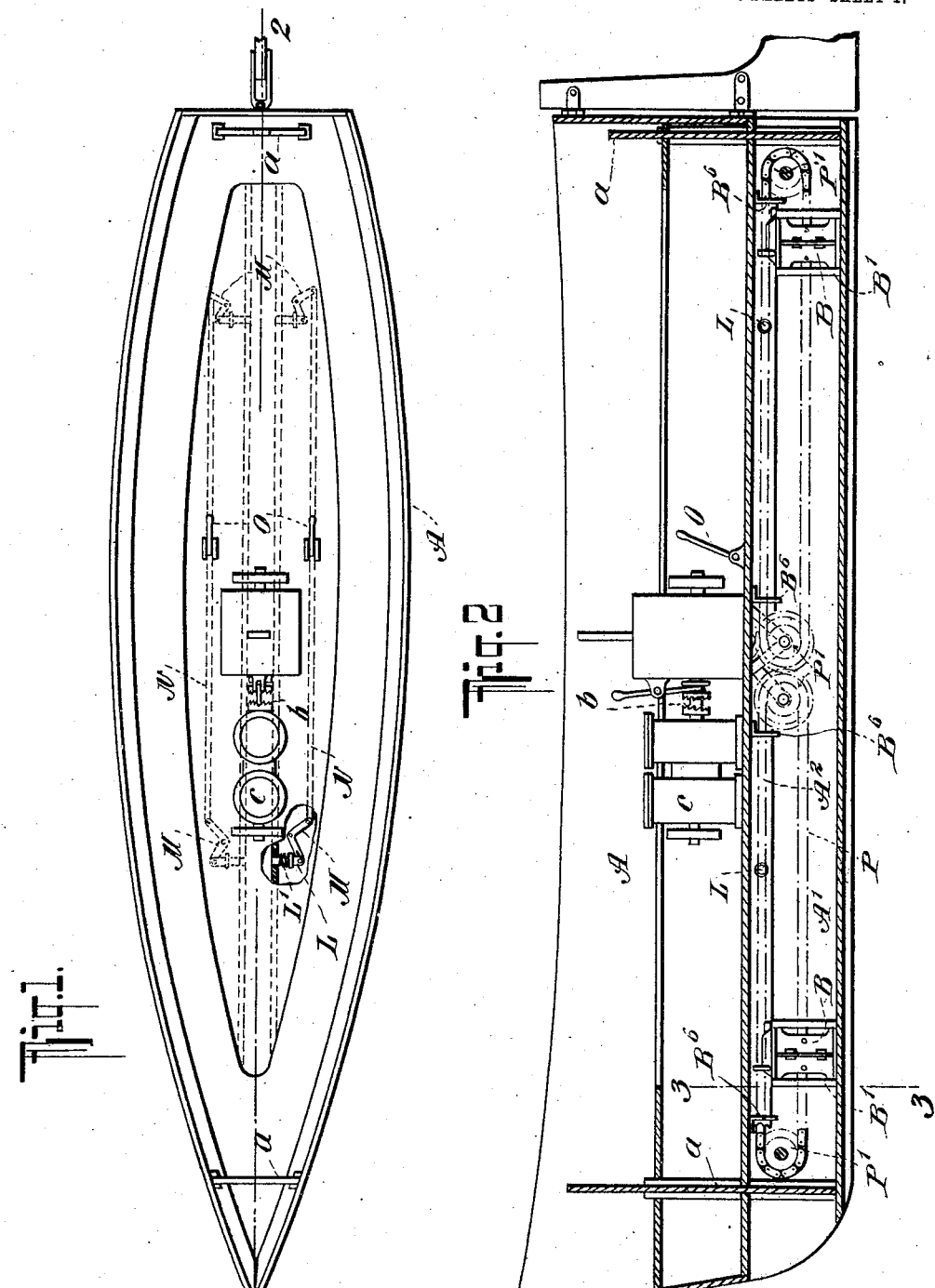

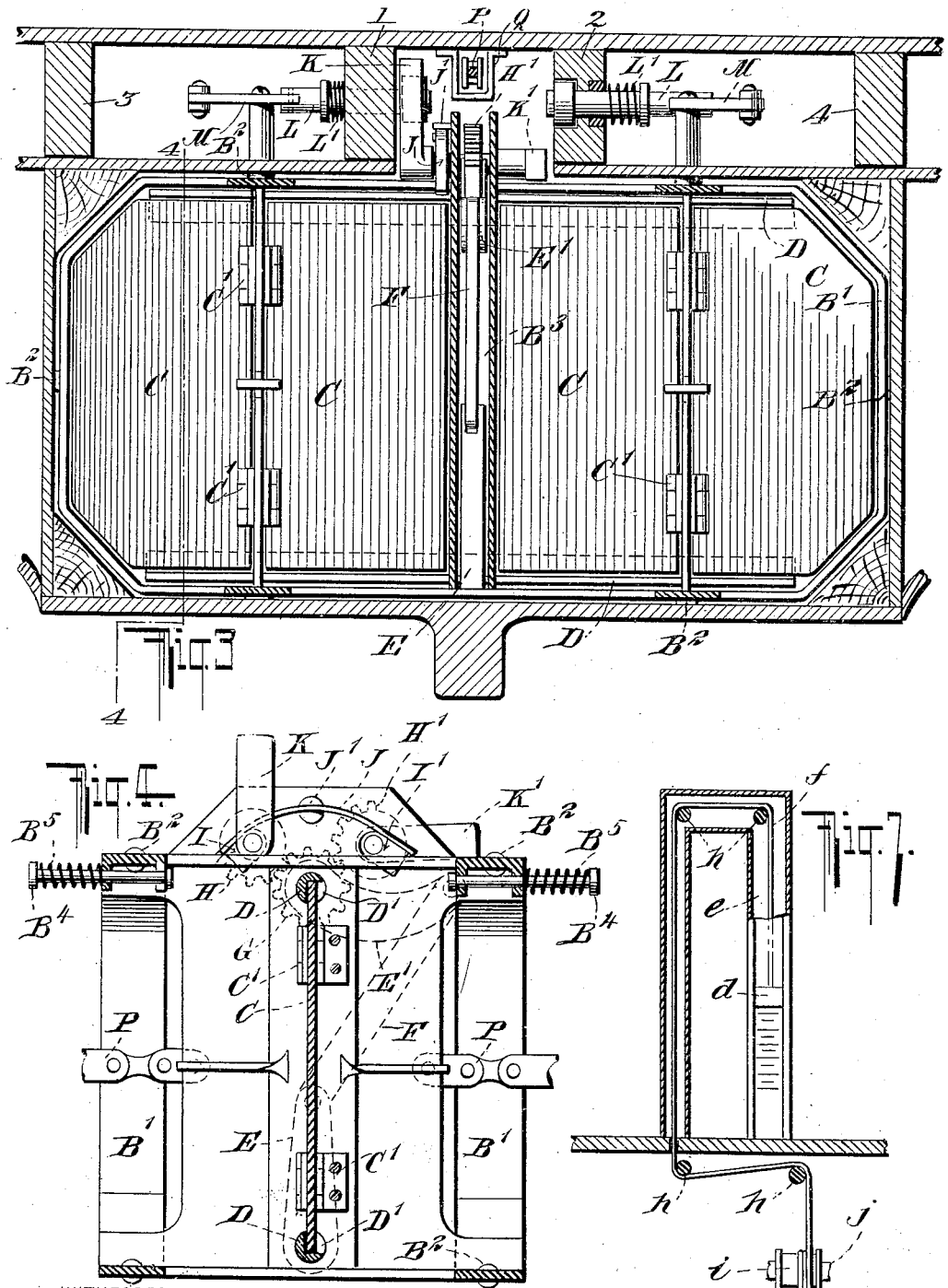

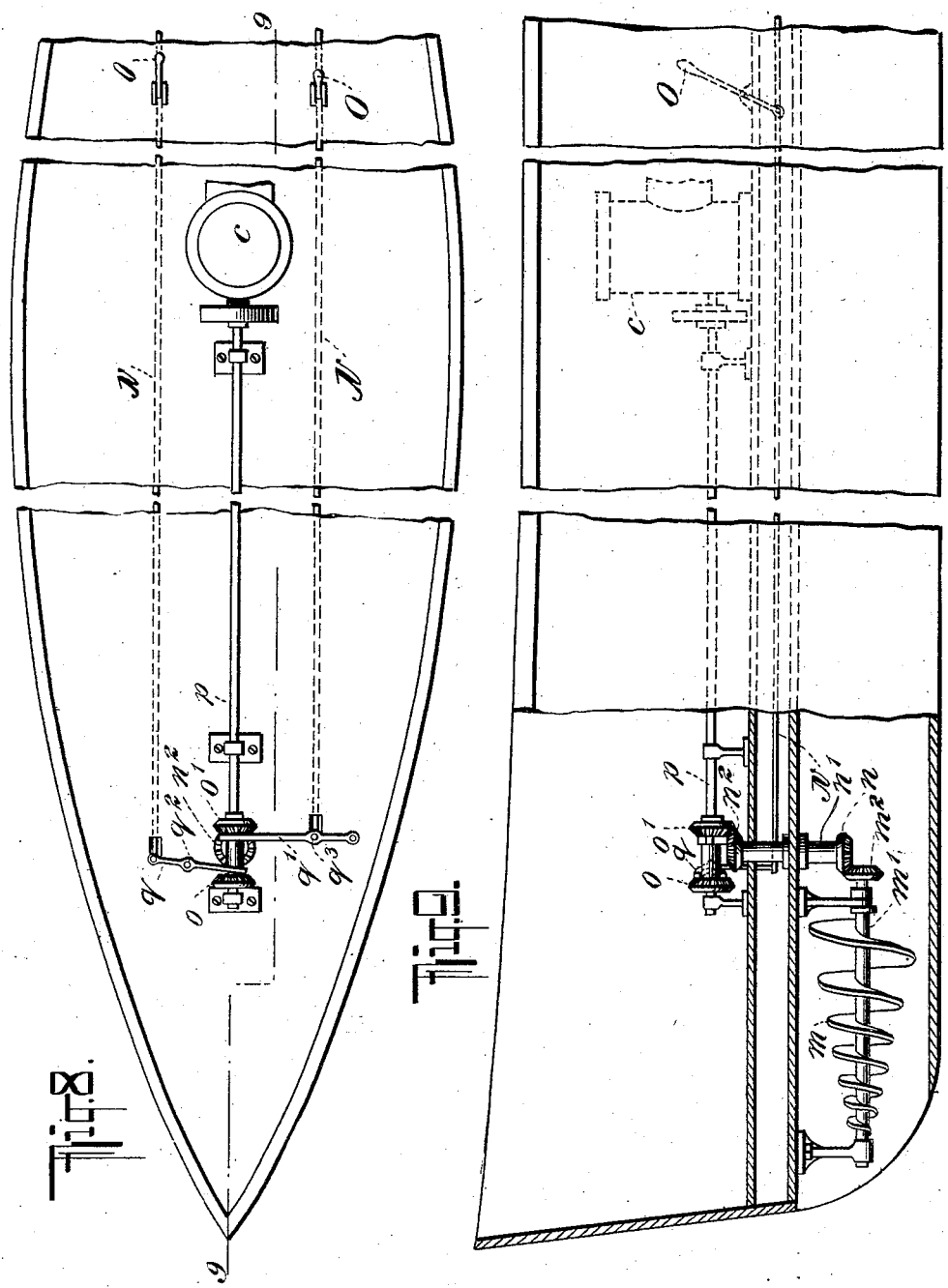

No. 876,470. PATENTED JAN. 14, 1908.
M. F. MAUS.
MEANS FOR PROPELLING VESSELS.
APPLICATION FILED MAR. 24, 1906.
5 SHEETS—SHEET 5.
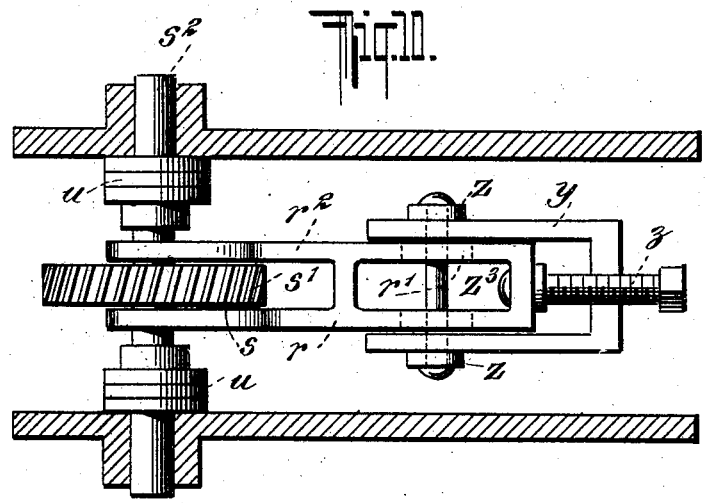
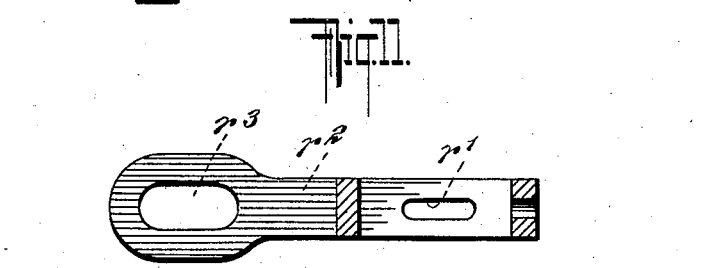
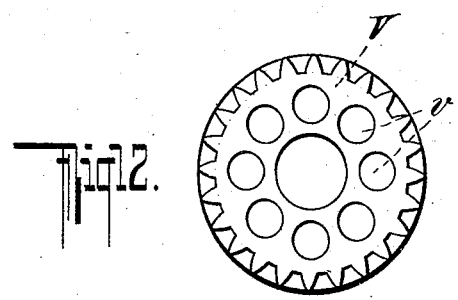
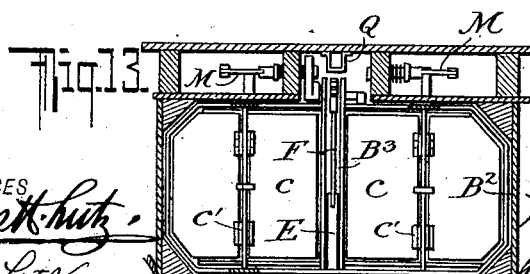
WITNESSES
INVENTOR
Markus F. Maus
BY
ATTORNEYS

UNITED STATES PATENT OFFICE.

MARKUS F. MAUS, OF LYNBROOK, NEW YORK.

MEANS FOR PROPELLING VESSELS.

No. 876,470.　　　　Specification of Letters Patent.　　　Patented Jan. 14, 1908.

Application filed March 24, 1906. Serial No. 307,903.

*To all whom it may concern:*

Be it known that I, MARKUS F. MAUS, a citizen of the United States, formerly a resident of the borough of Manhattan, city, county, and State of New York, and at present residing at Lynbrook, in the county of Nassau and State of New York, have invented certain new and useful Improvements in Means for Propelling Vessels, of which the following is a specification.

My invention relates to the propulsion of vessels particularly on the re-action principle, and has for its object to provide a simple, efficient and compact mechanism for the above indicated purpose, which will be readily reversed.

Other features of my invention will appear from the description given hereinafter and from the appended claims.

Reference is to be had to the accompanying drawings in which

Figure 1 is a plan of a vessel provided with my improvements, this plan showing chiefly the general arrangement of the motor and the reversing mechanism. Fig. 2 is a sectional elevation on line 2—2 of Fig. 1. Fig. 3 is a cross section taken on the line 3—3 of Fig. 2. Fig. 4 is a vertical section on line 4—4 of Fig. 3. Fig. 5 is a detail sectional elevation of the motor. Fig. 6 is a sectional elevation of the motor on line 6—6 of Fig. 5. Fig. 7 is a detail of an indicator connected with the motor. Fig. 8 is a partial plan illustrating another form of my invention. Fig. 9 is a sectional elevation on line 9—9 of Fig. 8. Fig. 10 is a detailed top view of certain parts shown at the upper portion of Fig. 5, partly in section. Fig. 11 is a face view of one of the elements shown in Fig. 10. Fig. 12 is a face view of one of the clutch wheels, and Fig. 13 is a cross sectional view of a slightly different form of my invention.

As illustrated by the drawings, the hull A of the vessel has a single central longitudinal channel A' which is preferably located entirely below the water line. A plurality of such channels may, however, be employed if desired. In the channel A' are arranged two pistons B adapted to move back and forth. Each piston comprises a frame B' which may be of octagonal shape, as shown in Fig. 3, and is preferably provided with a suitable number of antifriction rollers B² adapted to engage and travel on the walls of the channel A' and arranged to rotate about axes extending transversely to the path of the piston. Fig. 3 shows such rollers in engagement with the top, bottom and side walls of the channel A'. Each of the frames B' carries vanes or blades C which are pivoted to swing about perpendicular axes. These axes are determined by hinges C'. The size and form of the blades C are such that when the blades extend transversely as in Fig. 3, they will practically fill the cross section of the piston and thus give it an efficient working surface. It will be understood, however, that the motion of the piston has a tendency to open the blades C so as to allow the water to pass through the piston with but little resistance. This opening movement of the blades is allowed only while the piston moves in a pre-determined direction, while with the piston moving in the opposite direction the blades are arrested in the closed position by suitable stops. As shown in the drawings, these stops consist of bars D pivoted to the frame B' about axes transverse to the path of the piston and preferably also transverse to the axes about which the blades C swing, although this is not necessary.

In the construction shown, the stops D are horizontal and are provided with angular seats D' adapted to receive the edges of the blades C. For the sake of greater steadiness, there are preferably two stops, and in order to enable the action of the piston to be reversed, the stops D may be swung so that their transverse surface will lie either in front or in the rear of the blades C so as to keep them closed either during the forward or the rearward movement of the piston. When a plurality of movable stops are used as shown, they will be connected so as to properly move in unison. This may be done by providing an arm E on the lower stop D and connecting said arm by a link F with a corresponding arm E' on the upper stop. The arms E, E', and the link F may be located in a narrow central chamber B³ of the piston B, this chamber being of so small a width relatively that it has practically no influence on the operation of the piston. The arm E' may be forked at both ends, so that a gear wheel G may be mounted centrally on the shaft of the upper stop D. This gear wheel meshes with two mutilated gears H, H', the shafts of which are provided with angular portions I, I', engaged by the ends of a spring J, fastened to the piston frame at J'. Each mutilated gear is further provided with an arm K, K', respectively, one of said arms projecting upward into its active position when the other is retracted to its lower inactive position, and vice versa.

By reference to Fig. 4, it will be seen that should the arm K be moved to the right, this will have no effect upon the position of the stops D, since the gear H being mutilated will be able to turn in one direction without moving the gear G. Should the arm K however be moved to the left, the mutilated gear H will impart motion to the gears G and H', thus reversing the position of the stops D and causing the arm K' to project upward while the arm K is brought to its inactive position.

The object of the spring J is to restore the arm K to the position shown should it be moved to the right, and the spring will perform the same office with reference to the arm K' when the latter is in its operative position. Furthermore, the spring holds the arms K, K', steady whatever position they may be in.

From the above description, it will be understood that if the pistons are made to reciprocate in the channel A', they will be active, say, during the rearward stroke, and inactive during the forward stroke. If then any operating device is projected into the path of that arm K or K' which happens to be in the operative position shown for the arm K in Figs. 3 and 4, it will be obvious that the said arm either at the first or second stroke succeeding, will be thrown into its horizontal position, causing the stops D to perform a quarter of a revolution and thus reversing the action of the piston, since the blades will now be stopped during their forward movement if previously they were stopped during their rearward movement. The reversing mechanism may consist simply of pins L mounted to slide in suitable frame portions $A^2$ and normally held in their outer positions by springs L'. Each of the pins L is connected by an elbow lever M and a rod N with a suitable operating mechanism, such as a handle O. The details of this mechanism for projecting and retracting the pins L may be varied. It will be understood that this reversing mechanism is provided in duplicate, there being one pin L adapted to coöperate with the arm K of each piston and another pin L for the arm K' of each piston.

I will now describe the mechanism employed for imparting the reciprocating motion to the pistons, and I may remark here that the movements of the pistons are so timed that they move in opposite directions, that is, they first move toward each other and then from each other. In this manner, a more uniform driving action is exerted since one piston will be on its active stroke when the other is on its inactive or return stroke. Various mechanisms may be employed for obtaining this motion.

Each piston is secured or attached to a driving member movable lengthwise of the hull. In the particular instance shown, this driving member consists of a chain P for each piston, said chains passing around suitable sprocket wheels P' and having their upper runs preferably supported as by means of a guide piece Q (see Fig. 3). In order that the pistons may move in opposite directions, the two sprockets at the adjacent ends of the chains P are connected rigidly with intermeshing gear wheels R, R'. These gear wheels form part of a driving gear which also comprise the following members. Each of the gears R R' is in mesh with a toothed wheel S S' respectively, rigidly connected to a spiral transmission wheel T T', each pair of wheels being secured to a shaft U U'. The spiral wheels T T' engage similar wheels V V' which at the same time constitute clutch members, a face view of one of them being shown in Fig. 12. The wheels V V' are mounted loosely upon the drive shaft X on the central angular portion X' of which is mounted to slide a double clutch Y forming part of a reversing gear. This double clutch has an annular groove Y' of the well-known type into which are adapted to project rollers Z' upon a shifting lever Z fulcrumed at $Z^2$. The shifting lever Z has a pin $Z^3$ working in a slot $r'$ of a shifting rod $r$ which is operated by means of a crank pin $s$ projected from a worm wheel $s'$, which is mounted on a shaft $s'$, and driven by means of a worm $t$ secured to the shaft X. This shaft may be provided with ball-bearings $u$ of the character shown in Fig. 5, to take up end thrust, and similar bearings may also be used for the shafts U U'. The shifting rod $r$ is guided to move in practically a straight line by means of an arm $r^2$ having a slotted or forked portion $r^3$ which fits upon the shaft $s^2$. The crank pins $s$ projects into an opening of the shifting rod $r$, said opening being bounded by two arcs of a circle $r^4$ of comparatively large diameter and two arcs of a circle $r^5$ of a smaller diameter forming pockets which lie at a greater distance from the center of the opening than the arcs $r^4$. Assuming the worm wheel $s'$ to rotate in a direction indicated by the arrow in Fig. 5, it will be seen that for the next quarter of a revolution from the position shown, the crank pin or the roller mounted on such crank pin, will simply move along one of the arcs $r^4$ without affecting the position of the shifting rod $r$, the shaft $s^2$ engaging the other arc $r^4$ so that the shifting rod is held against it in movement. When the crank pin $s$ reaches its lowermost position, it will enter the pocket formed by the lower arc $r^5$ and will push the shifting rod $r$ toward the left, causing the clutch Y to move in the same direction. After the shifting of the clutch the crank pin $s$ will engage the left hand arc $r^4$ and will travel along the same without affecting the position of the parts and when the crank pin reaches its uppermost position, it will enter the upper pocket and shift the rod $r$ to the right in the same manner as above described. Any suitable construction of a double clutch may be employed but I prefer the one illustrated in Figs. 5 and 12. Each of the clutch disks V V' is provided with a series of openings or recesses $v$ into which are adapted to project a like number of pins $w$ pressed outward by springs $x$. Said pins are carried by the double clutch Y and are mounted to slide lengthwise of the shaft X. The parts are so proportioned that the shifting clutch member Y will become entirely disengaged from one of the clutch members V or V' before it engages the other.

In order that the operation of the shifting mechanism may be timed with great accuracy, the pin $Z^3$ which passes through the slot $r'$, is secured to a yoke $y$ adjustable by means of a screw $z$ mounted to turn on the shifting rod $r$. By this arrangement I may vary the position of the pin $Z^3$ relatively to the opening bounded by the arcs $r^4$ and $r^5$.

It will be understood that the double clutch member Y permanently rotates with the shaft X, but that the clutch members V V' are loose on said shaft. On the other hand, the worm $t$ is fastened on the shaft X and thus the worm wheel $s'$ is rotated permanently. In the position illustrated by Fig. 5 the shifting clutch member is in engagement with the right hand clutch disk V' and the train of gearing is caused to rotate in a predetermined direction, driving the pistons through the medium of the chains P. At a certain time, which is governed by the ratio of gearing between the worm $t$ and worm wheel $s'$, the crank pin $s$ will cause the rod $r$, the lever Z and the double clutch Y, to be shifted toward the left. Should the pins $w$ at the left happen to strike the clutch member V between the openings $v$ thereof, no injury to the mechanism can result, as the pins will in such a case yield against the tension of the springs $x$. As soon, however, as the pins register with the openings or sockets $v$, the springs will project the pins into such openings and thus couple the rotating clutch member Y with the clutch number V. It will, of course, be understood that the shifting clutch member should be fully disengaged from one side of the mechanism before it engages the clutch disk of the other side. When one of the clutch disks is driven the other also rotates on account of the connection effected by the gears R R', S S', but such clutch disk (in Fig. 5 the one at the left hand) will rotate idly. It will be obvious that the mechanism above described will cause the pistons B to reciprocate toward and from each other. The piston stroke can be altered by the simple substitution of another set of gears $t, s'$, as the stroke of the piston depends entirely on the number of revolutions of the driving shaft intervening between successive operations of the shifting mechanism.

For the sake of making repairs, it will be advisable to provide gates $a$ movable vertically or otherwise at points of the channel A' which are beyond the limits of the travel of the pistons. These gates are shown in their closed position in Fig. 2, but will, of course, be normally open. In Fig. 2, the motor is shown provided with a clutch $b$ so that the engine $c$ may be first started independently and then the motor proper thrown in.

In the making of repairs, it will be of assistance to be able to determine the position of the pistons within the channel A' without actually opening the top of the channel. For this purpose, I may employ the indicator shown in Figs. 6 and 7, the said indicator consisting of a weight $d$ movable in a suitable guideway $e$ and connected by a wire or cord $f$ passing over guides $h$ with a small drum $i$ on a shaft $j$. This shaft may be the same which carries one of the sprocket wheels P'.

In Figs. 8 and 9 I have illustrated a construction in which the channel A' in addition to the pistons B contains a screw propeller, either of the usual type or of the conical shape shown at $m$ in Fig. 9; this propeller is of course located beyond the limit of the piston's travel and is mounted on the shaft $m'$ provided with a bevel wheel $m^2$, meshing with the bevel wheel $n$ on the vertical shaft $n'$. This shaft also carries a bevel pinion $n^2$ adapted to mesh with one or the other of two clutch pinions $o, o'$ connected to move in unison upon a shaft $p$ driven by the engine, $c$, the clutch being held to rotate with said shaft. According as either the pinion $o$ or the pinion $o'$ is in mesh with the pinion $n^2$ the propeller $m$ will rotate in one direction or the other. In order that the propeller may be reversed at the same time as the action of the pistons B is reversed I prolong the rods N and connect them with shifting levers $q$ $q'$ pivoted at $q^2$ $q^3$ and arranged to shift the clutch member carrying the pinions $o$ $o'$. Fig. 8 shows the position of the parts immediately after the clutch has been shifted forward and before the lever $q$ and the rod N have been released by the operator to return to their former positions under the influence of the springs L'.

Various modifications may be made without departing from the nature of my invention.

While I have shown chains as driving members adapted to the pistons, I desire it to be understood that other means might be employed, such as racks attached to the top of one piston and to the bottom of the other and engaged by a central rack wheel mounted on the shaft of the gear wheels R R'. I prefer the use of chains, however, for the reason that they afford a very convenient means of producing a long piston stroke without necessitating any extra space for the reception of the driving mechanism and without sacrificing a large percentage of the power transmitted.

Instead of driving the chain wheels P' P' from the shaft X by means of toothed wheels any other suitable mechanism may be employed, such as cranks and connecting rods, either exclusively or in conjunction with gear wheels. A large number of the features of my invention herein described are contained in my pending application for Letters-Patent of the United States Serial No. 242,990, filed January 28, 1905. In fact, the embodiment of my invention described in the present application differs from that forming the subject matter of my said earlier application only by the substitution of a simplified and improved shifting and reversing mechanism shown in Figs. 5, 6, 10, 11 and 12 of the present application, the other figures being exact reproductions of the correspondingly numbered figures of the original case, with the exception that I have also added a buffer mechanism consisting for instance, of rods $B^4$ projected from each piston at each end and adapted to slide in the same direction in which the piston moves, being normally projected by springs $B^5$. These buffers are adapted to engage at the end of the piston stroke, suitable abutments $B^6$ secured to the hull within the channel. These buffers not only check the movement of the piston at the end of the stroke, but also have the function of correctly determining the position of the pistons. It will be understood that at the time a piston reaches the end of its stroke, the double clutch member Y is temporarily disengaged from both clutch disks V V' and thus the piston is entirely disconnected from its driving mechanism. The spring buffers are therefore capable of restoring the pistons to their predetermined correct position at the time that these pistons are temporarily disconnected from their driving mechanism. This buffer device may even render it unnecessary to employ the adjusting screw $z$ hereinbefore described, as the buffer will constitute an automatic adjusting or correcting device. While I have shown the buffer secured to the piston and the stop to the hull, it will of course, be understood that the position of these parts might be reversed.

The particular form of clutch shown in Figs. 5, 6 and 12, embodying spring-pressed pins, is capable of a general application.

The channel A' is not necessarily closed at the bottom, as in the specific embodiments of my invention described above, but may be open as shown in Fig. 13.

It is to be understood that the operating mechanism is mainly located in auxiliary channels formed by walls 1, 2, 3, and 4 and located above the channel A'. This construction results in reducing the area of the surface on which water may escape past the piston.

I claim as my invention:

1. As a means for propelling vessels, a piston mounted to reciprocate in a longitudinal channel of the vessel's hull, said piston comprising a blade pivoted to swing about an axis transverse to the path of the piston, and adapted to open as the piston moves in one direction, and to close as it moves in the opposite direction, a stop carried by the piston and mounted to turn about an axis transverse to the path of the piston and perpendicular to the first-named axis, to arrest the blade in the closed position either during the forward or during the rearward movement of the piston, and means for reversing the position of said stop.

2. As a means for propelling vessels, a piston mounted to reciprocate in a longitudinal channel of the vessel's hull, said piston comprising a frame provided with anti-friction devices, blades pivoted to said frame about parallel axes transverse to the path of the piston, stops pivoted to the frame about parallel axes likewise transverse to the path of the piston, but perpendicular to the first-named axes, said stops being arranged to engage the blades near opposite edges, either in front or in rear, a connection for causing such stops to move in opposite directions, and means for reversing the position of the stops.

3. As a means for propelling vessels, a piston mounted to reciprocate in a longitudinal channel of the vessel's hull, said piston comprising a blade pivoted to swing about a vertical axis, a stop carried by the piston and mounted to turn in the path of said blade about a horizontal axis transverse to the piston's path, and means for reversing the position of said stop.

4. As a means for propelling vessels, a piston mounted to reciprocate in a longitudinal channel of the vessel's hull, said piston comprising a blade pivoted to swing about an axis transverse to the piston's path, a pivoted stop carried by the piston and arranged to engage said blade, a gear wheel on said stop, a mutilated gear in mesh with said gear wheel, two arms connected with said mutilated gear, and movable operating means adapted to be projected into the path of said arms to reverse the position of the stop.

5. As a means for propelling vessels, a piston mounted to reciprocate in a longitudinal channel of the vessel's hull, said piston comprising a blade pivoted to swing about an axis transverse to the piston's path, a pivoted stop carried by the piston and arranged to engage said blade, a gear wheel on said stop, a mutilated gear in mesh with said gear wheel, a spring tending to bring the two gears into mesh, two arms connected with said mutilated gear and so disposed that one is projected when the other is retracted, and vice versa, and movable operating means carried by the hull and adapted to be shifted into the path of the projected arm to reverse the position and action of the stop.

6. As a means for propelling vessels, a piston mounted to reciprocate in a longitudinal channel of the vessel's hull, said piston comprising a blade pivoted to swing about an axis transverse to the piston's path, a pivoted stop carried by the piston and arranged to engage said blade, two arms connected operatively with said stop and so disposed that one is projected when the other is retracted, and vice versa, and operating means carried by the hull and movable into the path of the projected arm to reverse the position and the action of the stop.

7. As a means for propelling vessels, a piston mounted to reciprocate in a longitudinal channel of the vessel's hull, said piston comprising a blade pivoted to swing about an axis transverse to the piston's path, a pivoted stop carried by the piston and provided with an angular seat arranged to hold the blade either against forward or against rearward movement, according to the position of said stop, and means for reversing the position of the stop.

8. As a means for propelling vessels, a piston movable back and forth in a channel of the vessel's hull, a driving member attached to the piston, a driving gear connected with said member, a motor, a reversing gear for connecting the motor with the driving gear, and means driven by the motor for periodically changing the action of said reversing gear.

9. As a means for propelling vessels, a piston movable back and forth in a channel of the vessel's hull, a driving member attached to said piston, a driving gear connected with said member, a motor having two sections adapted to drive said gear in opposite directions, a reversing gear for connecting said driving gear with one section of the motor or the other, and means, driven by the motor, for periodically changing the action of said reversing gear.

10. As a means for propelling vessels, a piston movable back and forth in a channel of the vessel's hull and constructed to allow water to pass through the piston during movement in one direction, means for reversing the action of the piston, a rotary propelling device, a motor for said rotary propelling device, and means connected with the reversing mechanism of the piston, for reversing said rotary propelling device.

11. As a means for propelling vessels, a piston movable lengthwise of the hull below the water line and constructed to be inactive during one of its strokes, a motor, a reversing mechanism for connecting said motor alternately with the piston in oppositely acting fashion to reciprocate the piston, and a buffer for checking and positioning the piston at the end of its stroke, while the piston is temporarily disconnected from the motor.

12. As a means for propelling vessels, a piston movable lengthwise of the hull below the water line and constructed to be inactive during one of its strokes, a motor, a shifting clutch member rotatable with said motor, means, controlled by said motor, for periodically shifting said clutch member, two driven clutch members adapted to be engaged alternately by said shifting clutch member and to be actuated thereby, and piston-operating mechanism connected with each of the driven clutch members, to produce a reciprocating motion of the piston.

13. As a means for propelling vessels, a piston movable lengthwise of the hull below the water line and constructed to be inactive during one of its strokes, a motor, a shifting clutch member rotatable with said motor, a shifting rod operatively connected with said clutch member and provided with a recess having an outline formed by two arcs of circles and pockets between them, a rotating member operatively connected with the motor and having an eccentric projection arranged in the said recess of the shift rod, two driven clutch members adapted to be engaged alternately by said shifting clutch member and to be actuated thereby, and piston-operating mechanism, connected with each of the driven clutch members, to produce a reciprocating motion of the piston.

14. As a means for propelling vessels, a piston movable lengthwise of the hull below the water line and constructed to be inactive during one of its strokes, a motor, a shifting clutch member rotatable with said motor, a shifting rod operatively connected with said clutch member and provided with a recess having an outline formed by two arcs of circles and pockets between them, a rotating member operatively connected with the motor and having an eccentric projection arranged in the said recess of the shift-rod, means for adjusting the connection of the shifting rod with the said clutch member to accurately time the action of the shifting mechanism, two driven clutch members adapted to be engaged alternately by said shifting clutch-member and to be actuated thereby, and piston-operating mechanism, connected with each of the driven clutch members, to produce a reciprocating motion of the piston.

15. As a means for propelling vessels, walls forming a channel, a piston moving lengthwise of said channel and constructed to be inactive during one of its strokes, additional walls projected above said first named walls to form auxiliary channels and operating mechanism located in said auxiliary channels.

In testimony whereof I have signed my name to this specification in the presence of two subscribing witnesses.

MARKUS F. MAUS.

Witnesses:
JOHN LOTKA,
JOHN A. KEHLENBECK.